US012613003B2

(12) United States Patent
Ohashi et al.

(10) Patent No.: US 12,613,003 B2
(45) Date of Patent: Apr. 28, 2026

(54) HYDROGEN GAS TRANSFER SYSTEM

(71) Applicant: KAWASAKI JUKOGYO KABUSHIKI KAISHA, Kobe (JP)

(72) Inventors: Tetsuya Ohashi, Kobe (JP); Kazuya Hagiwara, Kobe (JP); Haruhiko Tominaga, Kobe (JP); Asako Mitsuhashi, Kobe (JP); Nobuhiko Sugiyama, Kobe (JP); Masashi Matsuo, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 44 days.

(21) Appl. No.: 18/585,491

(22) Filed: Feb. 23, 2024

(65) Prior Publication Data

US 2024/0247758 A1 Jul. 25, 2024

Related U.S. Application Data

(63) Continuation of application No. PCT/JP2021/031607, filed on Aug. 27, 2021.

(51) Int. Cl.
*F17C 7/04* (2006.01)

(52) U.S. Cl.
CPC ........ *F17C 7/04* (2013.01); *F17C 2203/0379* (2013.01); *F17C 2203/0619* (2013.01); *F17C 2203/0626* (2013.01); *F17C 2203/0629* (2013.01); *F17C 2205/0352* (2013.01); *F17C 2221/012* (2013.01); *F17C 2223/0153* (2013.01); *F17C 2227/0157* (2013.01); *F17C 2227/0304* (2013.01); *F17C 2227/0323* (2013.01); *F17C 2265/066* (2013.01); *F17C 2270/0105* (2013.01)

(58) Field of Classification Search
CPC combination set(s) only.
See application file for complete search history.

(56) References Cited

U.S. PATENT DOCUMENTS

| | | | | |
|---|---|---|---|---|
| 10,207,775 | B2 | 2/2019 | Uraguchi et al. | |
| 2004/0155149 | A1* | 8/2004 | Dossas | B64B 1/62 244/128 |
| 2006/0081290 | A1* | 4/2006 | Sachs | F17C 7/00 137/340 |
| 2012/0298206 | A1* | 11/2012 | Pierce | F17C 11/005 137/334 |
| 2013/0170961 | A1 | 7/2013 | Meucci et al. | |
| 2014/0352801 | A1* | 12/2014 | McAlister | B67D 7/3209 206/459.1 |

(Continued)

FOREIGN PATENT DOCUMENTS

| | | | |
|---|---|---|---|
| CN | 209761836 | U | 12/2019 |
| FR | 3079006 | A1 | 9/2019 |
| JP | 2015-004382 | A | 1/2015 |

*Primary Examiner* — Binh Q Tran
(74) *Attorney, Agent, or Firm* — Sughrue Mion, PLLC

(57) ABSTRACT

A hydrogen gas transfer system (S) includes: a gas compressor (15) configured to compress hydrogen gas (HG) and enclosing therein a seal gas (SG) for sealing the hydrogen gas (HG); a gas supply passage (11) configured to supply the hydrogen gas (HG) to the gas compressor (15); and a heater (13) disposed in the gas supply passage (11) and configured to heat the hydrogen gas (HG) to a predetermined temperature equal to or higher than a boiling point of the seal gas (SG).

6 Claims, 5 Drawing Sheets

(56) References Cited

U.S. PATENT DOCUMENTS

| | | | |
|---|---|---|---|
| 2016/0137272 A1 | 5/2016 | Uraguchi et al. | |
| 2017/0122159 A1* | 5/2017 | Bahrami | F01N 3/208 |
| 2019/0011179 A1 | 1/2019 | Tezuka et al. | |
| 2019/0334185 A1* | 10/2019 | Lototskyy | F17C 11/005 |
| 2022/0349527 A1* | 11/2022 | Sperrin | C01B 3/0026 |
| 2024/0151358 A1* | 5/2024 | Minas | F17C 5/04 |

* cited by examiner

HYDROGEN GAS TRANSFER SYSTEM

CROSS REFERENCE TO THE RELATED APPLICATION

This application is a continuation application, under 35 U.S.C. § 111(a), of international application No. PCT/JP2021/031607, filed Aug. 27, 2021, the entire disclosure of all of which is herein incorporated by reference as a part of this application.

BACKGROUND OF THE INVENTION

Field of the Invention

The present disclosure relates to a hydrogen gas transfer system.

Description of Related Art

In recent years, to achieve a so-called low-carbon society, a technology utilizing hydrogen as fuel for various devices has been proposed, and the need for a system for transferring and storing hydrogen (e.g., see Patent Document 1) has been growing.

Hydrogen has been known to be stored as liquefied hydrogen. The temperature of liquefied hydrogen is low and about −253° C., and low-temperature vaporized gas is generated due to heat input from the outside while liquefied hydrogen is stored. This vaporized gas can also be utilized as fuel. For example, in a liquefied hydrogen carrier vessel, it is conceivable to utilize vaporized gas as fuel for a propulsion system of the liquefied gas carrier vessel. However, in such a case, the pressure of the vaporized gas needs to be increased to a pressure required for a power source of the propulsion system, and a gas compressor for pressure increase needs to be used.

RELATED DOCUMENT

Patent Document

[Patent Document 1] JP Laid-Open Patent Publication No. 2015-004382

SUMMARY OF THE INVENTION

In the above-described gas compressor, seal gas is generally used to prevent hydrogen from leaking from a periphery of a sliding element. However, the temperature of vaporized gas of liquefied hydrogen is low as described above, and is lower than a boiling point of a gas of a type that is generally used as seal gas. Thus, when the seal gas is cooled by low-temperature hydrogen gas and is liquefied, the seal gas may not be able to fulfill the function as seal gas.

In order to solve the above-described problem, an object of the present disclosure is to make it possible to use low-temperature hydrogen gas without impairing the function of seal gas which is generally used, in a system configured to transfer hydrogen.

In order to achieve the above-described object, a hydrogen gas transfer system according to the present disclosure is configured to transfer hydrogen gas and includes:

- a gas compressor configured to compress the hydrogen gas and enclosing therein a seal gas for sealing the hydrogen gas;
- a gas supply passage configured to supply the hydrogen gas to the gas compressor; and
- a heater disposed in the gas supply passage and configured to heat the hydrogen gas to a predetermined temperature equal to or higher than a boiling point of the seal gas.

Any combination of at least two constructions, disclosed in the appended claims and/or the specification and/or the accompanying drawings should be construed as included within the scope of the present disclosure. In particular, any combination of two or more of the appended claims should be equally construed as included within the scope of the present disclosure.

BRIEF DESCRIPTION OF THE DRAWINGS

In any event, the present disclosure will be more clearly understood from the following description of preferred embodiment thereof, when taken in conjunction with the accompanying drawings. However, the embodiment and the drawings are given only for the purpose of illustration and explanation, and are not to be taken as limiting the scope of the present disclosure in any way whatsoever, which scope is to be determined by the appended claims. In the accompanying drawings, like reference numerals are used to denote like parts throughout the several views. In the figures.

DESCRIPTION OF EMBODIMENTS

Figure 1:
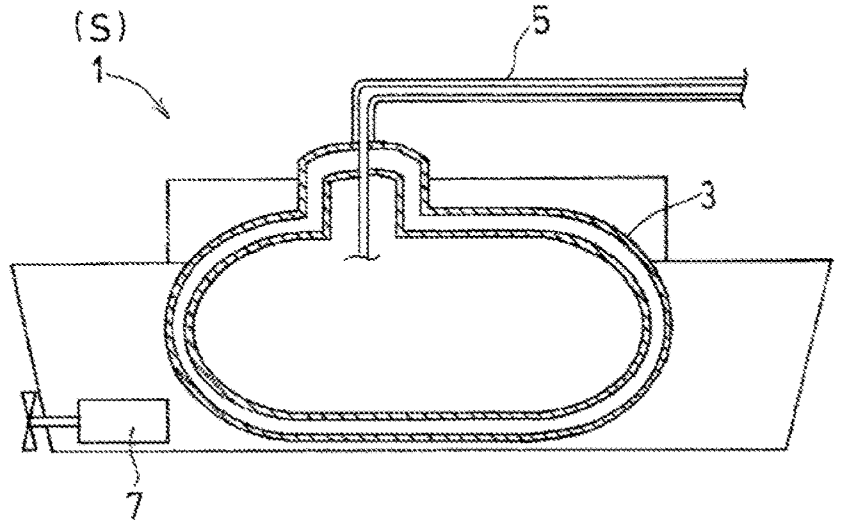
FIG. 1 is a schematic view showing one example of a hydrogen gas transfer system according to one embodiment of the present disclosure.

Hereinafter, embodiments of the present disclosure will be described with reference to the drawings. FIG. 1 shows a liquefied hydrogen carrier vessel 1 which is a facility in which a hydrogen gas transfer system S according to one embodiment of the present disclosure is installed. In the present embodiment, the liquefied hydrogen carrier vessel 1 will be described as an example of the hydrogen gas transfer system S. The liquefied hydrogen carrier vessel 1 includes, for example, a liquefied hydrogen storage tank 3 (hereinafter, simply referred to as "storage tank") for storing liquefied hydrogen, and a transfer pipe 5 for transferring liquefied hydrogen from the storage tank 3 or to the storage tank 3. The liquefied hydrogen carrier vessel 1 further includes a power device 7 configured to output propulsive power for the liquefied hydrogen carrier vessel 1, using hydrogen gas generated by vaporization of the liquefied hydrogen in the liquefied hydrogen carrier vessel 1.

In the present specification, the "hydrogen gas transfer system" refers to a system for transfer from a hydrogen reservoir such as the storage tank 3 exemplified in the above, to hydrogen gas consuming equipment such as the power device 7. Examples of the facility to which the hydrogen gas transfer system is applied include not only the exemplified liquefied hydrogen carrier vessel 1 but also various facilities such as transportation equipment which is operated using hydrogen as fuel and a plant for storing hydrogen, in addition to transportation equipment such as a ship, a vehicle, and an aircraft for transporting liquefied hydrogen, like the above-described liquefied hydrogen carrier vessel 1.

Figure 2:
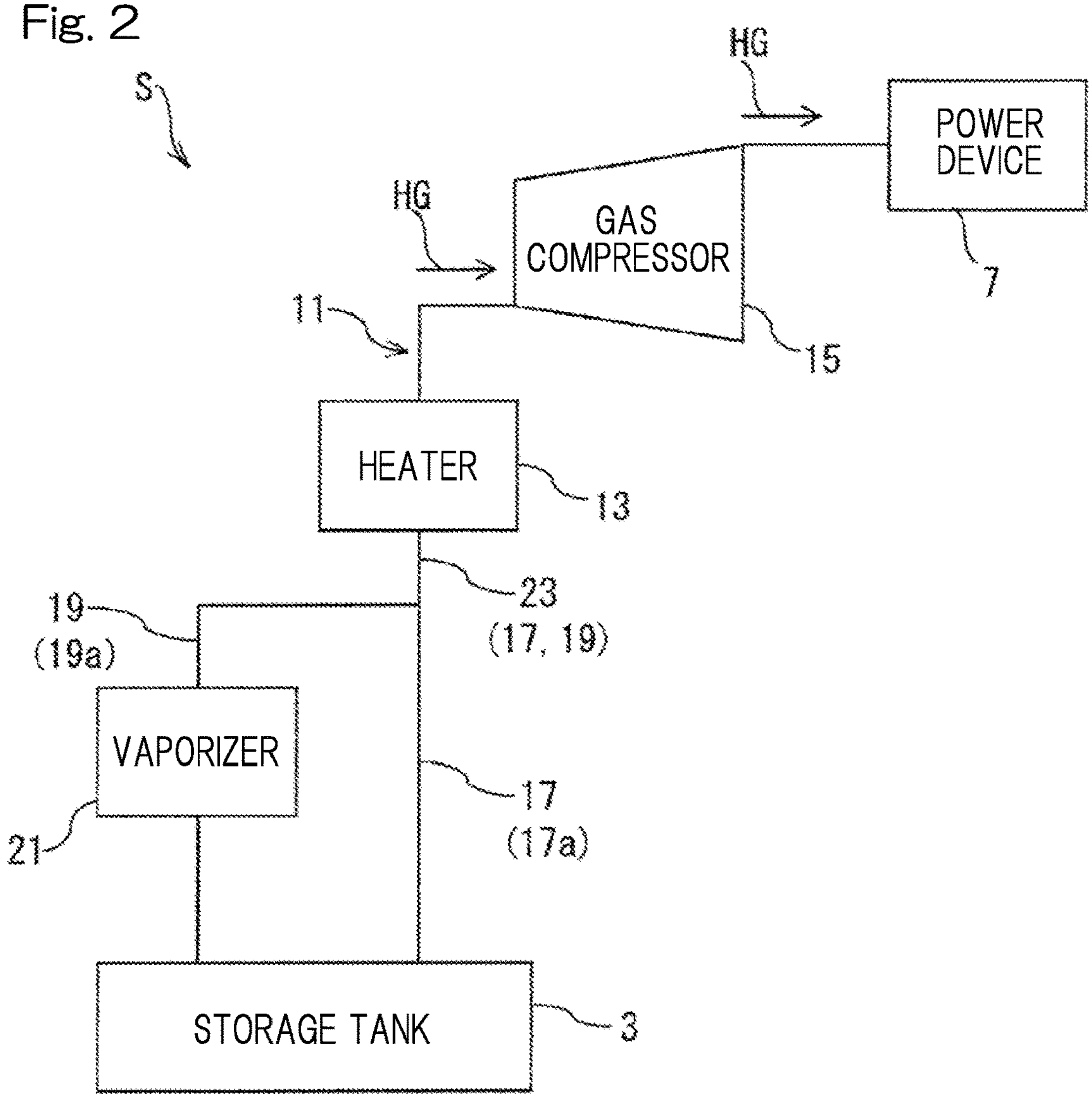
FIG. 2 is a block diagram showing a schematic configuration of the hydrogen gas transfer system in FIG. 1.

In the present embodiment, as shown in FIG. 2, the hydrogen gas transfer system S includes a gas supply passage 11, a heater 13, and a gas compressor 15.

The gas supply passage 11 is a passage for supplying hydrogen gas HG to the gas compressor 15. Specifically, in the present embodiment, the gas supply passage 11 includes a naturally vaporized gas supply passage 17 and a forcibly vaporized gas supply passage 19.

The naturally vaporized gas supply passage 17 is a passage for supplying, to the gas compressor 15, hydrogen gas HG generated by natural vaporization of liquefied hydrogen in the storage tank 3. In the illustrated example, the naturally vaporized gas supply passage 17 is connected to the storage tank 3. Specifically, for example, an upstream end of a pipe forming the naturally vaporized gas supply passage 17 extends to an upper space in the storage tank 3.

A vaporizer 21 configured to forcibly vaporize liquefied hydrogen is disposed in the forcibly vaporized gas supply passage 19. Vaporized gas generated by the vaporizer 21 is supplied to the gas compressor 15 through the forcibly vaporized gas supply passage 19. In the illustrated example, the forcibly vaporized gas supply passage 19 is connected to the storage tank 3. Specifically, an upstream end of a pipe forming the forcibly vaporized gas supply passage 19 extends to the vicinity of a bottom wall in the storage tank 3.

In the present embodiment, the gas supply passage 11 includes a portion connected to the gas compressor 15, the portion being formed as a common gas supply passage 23 serving as both the naturally vaporized gas supply passage 17 and the forcibly vaporized gas supply passage 19. In other words, the naturally vaporized gas supply passage 17 and the forcibly vaporized gas supply passage 19 are formed as separate lines of the gas supply passage 11 at the upstream sections thereof and are connected so as to merge with each other midway to form the above-described single common gas supply passage 23. The common gas supply passage 23 is connected to the gas compressor 15. In the following description, when there is a need to make a distinction, the separate gas supply passage portions of the naturally vaporized gas supply passage 17 and the forcibly vaporized gas supply passage 19, upstream of the common gas supply passage 23 may be referred to as "naturally vaporized gas passage separate portion 17*a*" and "forcibly vaporized gas passage separate portion 19*a*", respectively.

The heater 13 is disposed in the gas supply passage 11 and is configured to heat hydrogen gas HG passing through the gas supply passage 11, to a predetermined temperature equal to or higher than the boiling point of a seal gas SG (FIG. 3) described below. For example, a shell-and-tube heater, a plate heater, an extended heater, a finned tube heater, a pin tube heater, a heat trace heater, or the like can be used as the heater 13. The heater 13 may be used as a heat exchanger which uses high-temperature fluid discharged from another component in the hydrogen gas transfer system S as a heating medium and uses the hydrogen gas HG as a cooling medium.

The vaporizer 21 heats and vaporizes liquefied hydrogen passing through the forcibly vaporized gas supply passage 19. In the illustrated example, the vaporizer 21 is disposed in the forcibly vaporized gas passage separate portion 19*a*. The above-described various heating devices to be used as the heater 13 can be used as the vaporizer 21.

The gas compressor 15 compresses the hydrogen gas HG supplied from the gas supply passage 11. Specifically, in this example, the gas compressor 15 compresses the hydrogen gas HG to a pressure required for the power device 7 which uses the hydrogen gas HG as fuel.

Figure 3:
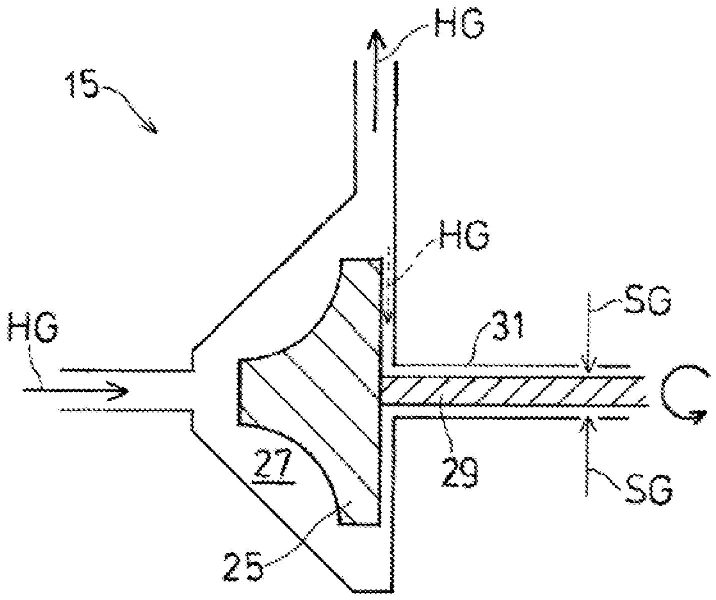
FIG. 3 is a longitudinal section view schematically showing one example of a gas compressor used in the hydrogen gas transfer system in FIG. 1.

In this example, as shown in FIG. 3, the gas compressor 15 of an impeller type is used. The seal gas SG for sealing the hydrogen gas HG is enclosed in the gas compressor 15. That is, the gas compressor 15 has a gap around a sliding element for compressing gas (impeller 25 in this example), and thus the compressed hydrogen gas HG may leak from a compression chamber 27 through the gap. Such leaking is prevented by enclosing the seal gas SG in the gas compressor 15. In the illustrated example, the seal gas SG is enclosed inward of a rotary shaft housing 31 covering a rotary shaft 29 for rotating the impeller 25. The seal gas SG prevents the hydrogen gas HG from leaking toward the side of the rotary shaft 29, passing behind the impeller 25, as indicated with a broken line.

Figure 4:
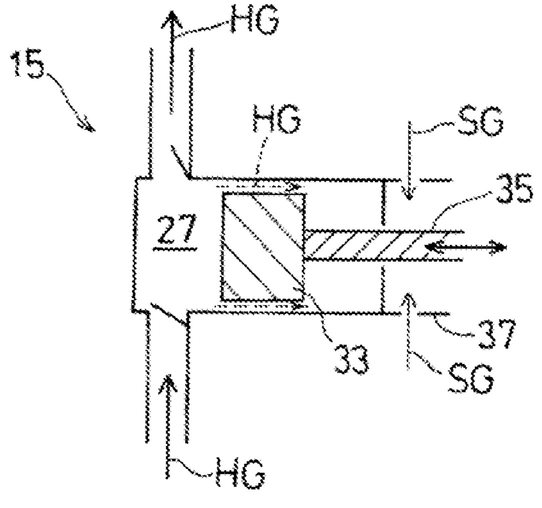
FIG. 4 is a longitudinal section view schematically showing another example of the gas compressor used in the hydrogen gas transfer system in FIG. 1.

The gas compressor 15 is not limited to this example, and any kind of gas compressor 15 may be used as long as the gas compressor 15 is capable of compressing hydrogen gas to a pressure required by the power device 7 (FIG. 2) as described above. For example, as shown in FIG. 4 as a variant, the gas compressor 15 may be a gas compressor 15 of a piston type. In this case, the seal gas SG is enclosed inward of a rod housing 37 covering a piston rod 35 for reciprocating a piston 33. The seal gas SG prevents the hydrogen gas HG from leaking toward the side of the piston rod 35, passing around the periphery of the piston 33, as indicated with a broken line.

In this example, nitrogen gas (boiling point: about −196° C., melting point: about −210° C.) is used as the seal gas SG. Other than the nitrogen gas, an inert gas such as argon may be used as the seal gas SG.

Although not described or shown in the above embodiment, various valves for controlling the flow of the hydrogen gas HG may be provided at appropriate portions of the gas supply passage 11. In addition, a temperature measuring device for measuring the temperature of the hydrogen gas HG may be provided to the heater 13 or around the heater 13.

The specific configuration mode of the hydrogen gas transfer system S is not limited to the above example. Hereinafter, a variant will be described, in which the configuration of the gas supply passage 11 and the arrangement of the heater 13 are modified.

Figure 5:
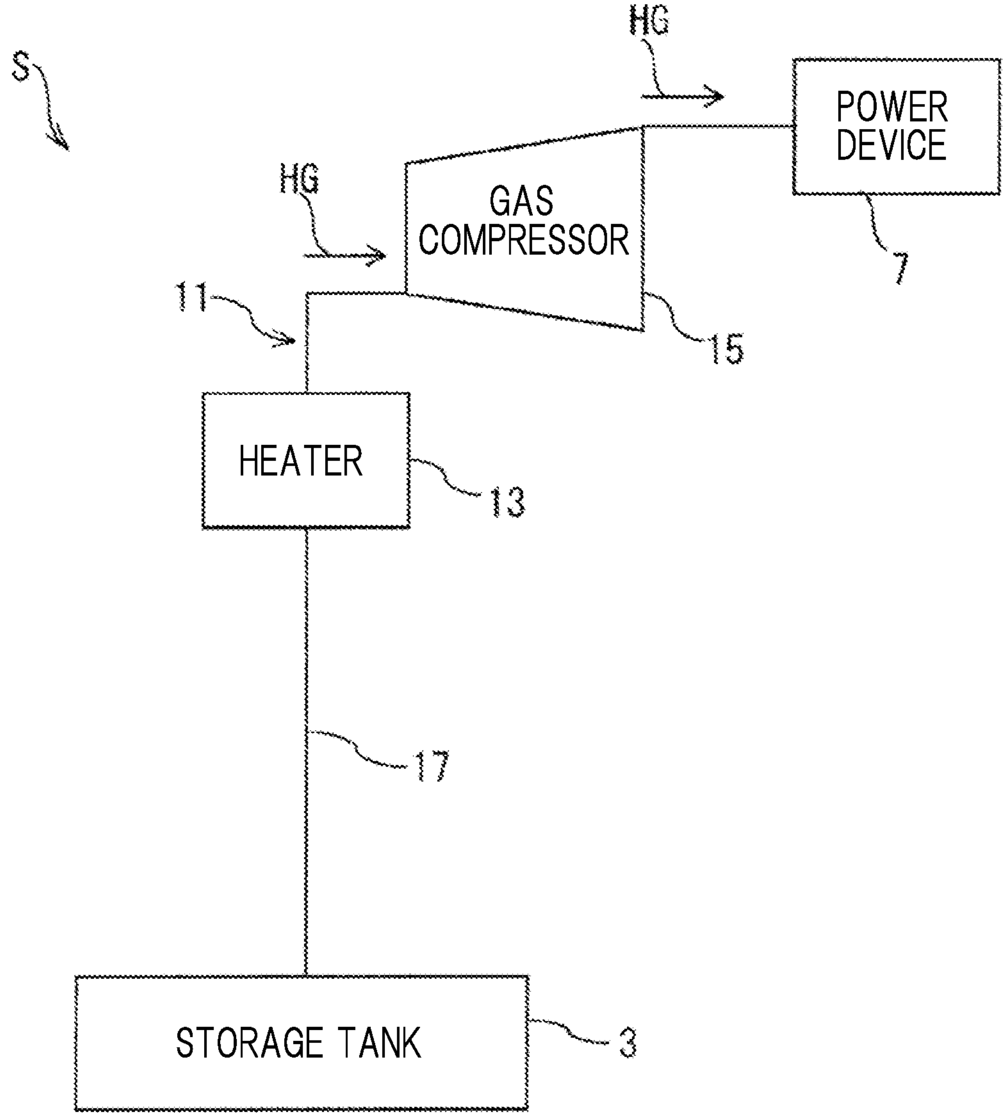
FIG. 5 is a block diagram showing a schematic configuration of one variant of the hydrogen gas transfer system in FIG. 1.

It is not essential to provide the forcibly vaporized gas supply passage 19 in the hydrogen gas transfer system S. As shown in FIG. 5, there may be the naturally vaporized gas supply passage 17 only, and the heater 13 may be disposed in the naturally vaporized gas supply passage 17.

Figure 6:
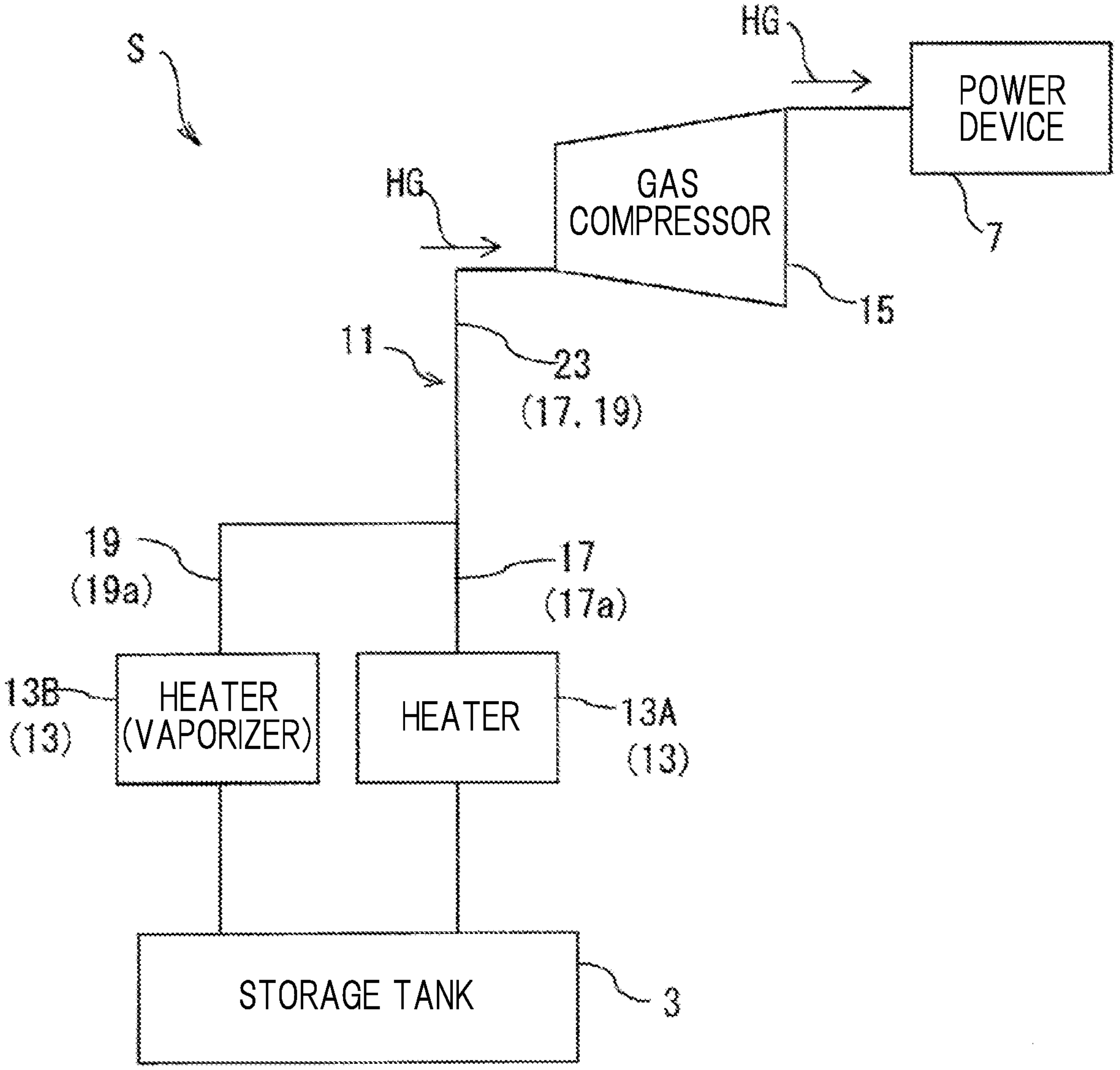
FIG. 6 is a block diagram showing a schematic configuration of another variant of the hydrogen gas transfer system in FIG. 1.

In the hydrogen gas transfer system S, in the case where there is the forcibly vaporized gas supply passage 19, and the gas supply passage 11 includes a portion connected to the gas compressor 15, the portion being formed as the common gas supply passage 23 as in the example in FIG. 2, heaters 13 (first heater 13A and second heater 13B) may be disposed in the naturally vaporized gas passage separate portion 17*a* and the forcibly vaporized gas passage separate portion 19*a*, respectively, which are located upstream with respect to the common gas supply passage 23, as shown in FIG. 6. In this example, the second heater 13B disposed in the forcibly vaporized gas passage separate portion 19*a* also serves as the vaporizer 21. As a matter of course, the vaporizer 21 and the heater 13 may be separately disposed in the forcibly vaporized gas passage separate portion 19*a*.

Figure 7:
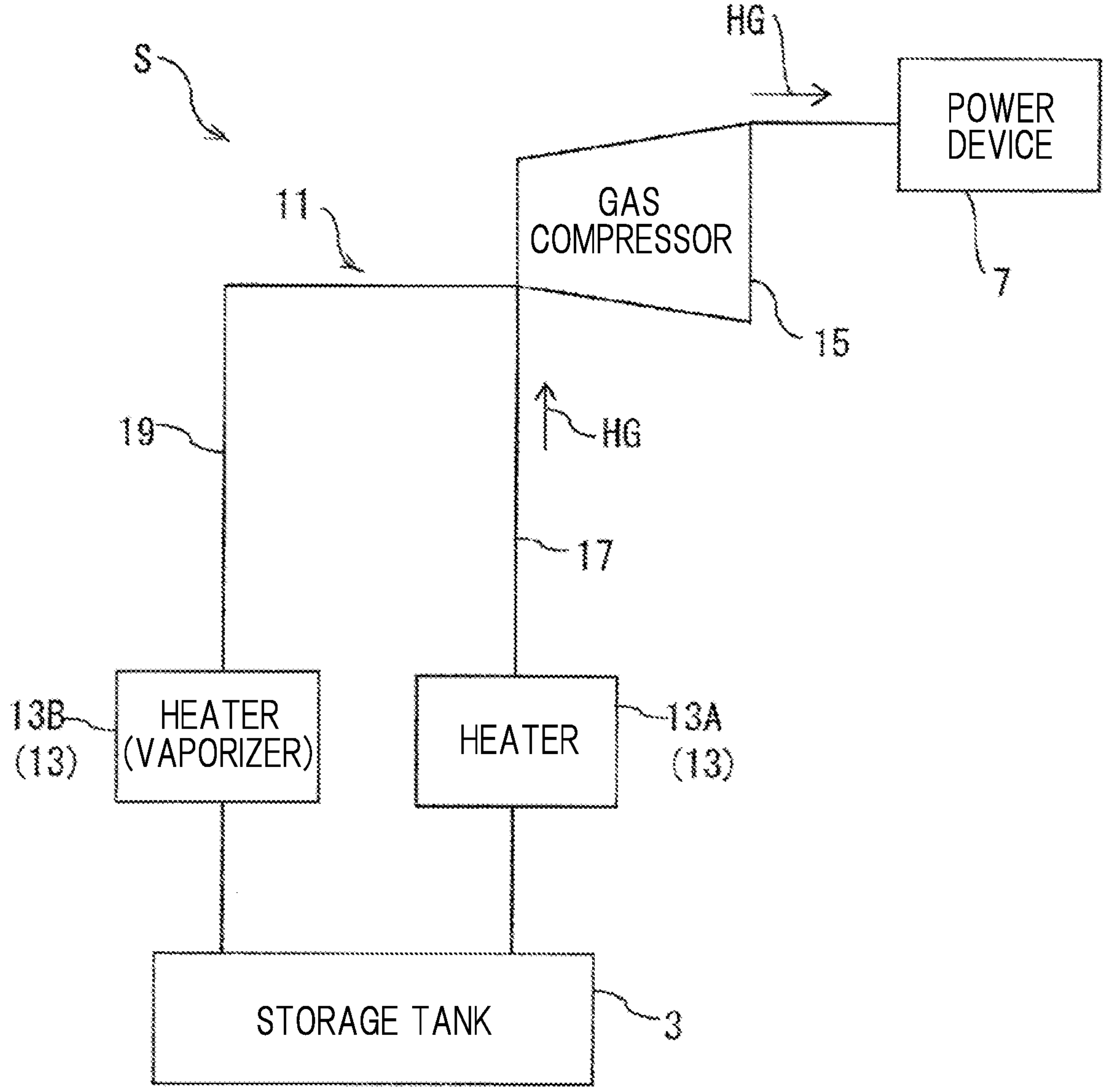
FIG. 7 is a block diagram showing a schematic configuration of another variant of the hydrogen gas transfer system in FIG. 1.

In the case where the hydrogen gas transfer system S includes the forcibly vaporized gas supply passage 19, it is not essential to form the common gas supply passage 23 as shown in FIG. 2, and the naturally vaporized gas supply passage 17 and the forcibly vaporized gas supply passage 19 may be independently connected to the gas compressor 15 as shown in FIG. 7. In this case, the heaters 13 (first heater 13A and second heater 13B) are disposed in the naturally vaporized gas supply passage 17 and the forcibly vaporized gas supply passage 19, respectively. In this case, the second heater 13B disposed in the forcibly vaporized gas supply passage 19 may also serve as the vaporizer 21 as with the example in FIG. 2, or may be a heater 13 that is separate from the vaporizer 21.

In any one of the above-described examples, a plurality of the heaters 13 may be arranged in series, unlike the illustrated example.

In addition, in any one of the above-described examples, the illustrated configuration example of the hydrogen gas transfer system S includes the storage tank 3 for the liquefied hydrogen and at least the naturally vaporized gas supply passage 17 as the gas supply passage 11, and hydrogen gas HG generated by vaporization of the liquefied hydrogen stored in the storage tank 3 is compressed by the gas compressor 15. According to this configuration, hydrogen gas HG generated by natural vaporization of liquefied hydrogen can be effectively utilized in a system capable of storing liquefied hydrogen. As a matter of course, hydrogen gas HG may be stored beforehand in the state of the hydrogen gas HG at a temperature lower than the boiling point or the melting point of the seal gas SG in the hydrogen gas transfer system S.

In the hydrogen gas transfer system S according to the present embodiment as described above, as shown in FIG. 2, the heater 13 is disposed in the gas supply passage 11 to the gas compressor 15, and the hydrogen gas HG is heated to a predetermined temperature equal to or higher than the boiling point of the seal gas SG in FIG. 3 before being supplied to the gas compressor 15. Therefore, this prevents the seal gas from being cooled and liquefied by the low-temperature hydrogen gas. As a result, the hydrogen gas HG can be utilized as fuel and the like, without impairing the sealing function of the seal gas SG enclosed in the gas compressor 15. In addition, this can prevent the function of the gas compressor from being impaired by liquefaction of the seal gas.

Although the present disclosure has been fully described in connection with the preferred embodiment thereof with reference to the accompanying drawings, numerous additions, modifications, or omissions can be made without departing from the gist of the present disclosure. Accordingly, such additions, modifications, or omissions are to be construed as included in the scope of the present disclosure.

REFERENCE NUMERALS

3 . . . liquefied hydrogen storage tank
11 . . . gas supply passage
15 . . . gas compressor
17 . . . naturally vaporized gas supply passage
19 . . . forcibly vaporized gas supply passage
21 . . . vaporizer
HG . . . hydrogen gas
S . . . hydrogen gas transfer system
SG . . . seal gas

What is claimed is:

1. A hydrogen gas transfer system configured to transfer hydrogen gas, the hydrogen gas transfer system comprising:
- a gas compressor configured to compress the hydrogen gas and enclosing therein a seal gas for sealing the hydrogen gas;
- a gas supply passage configured to supply the hydrogen gas to the gas compressor; and
- a heater disposed in the gas supply passage and configured to heat the hydrogen gas to a predetermined temperature equal to or higher than a boiling point of the seal gas.

2. The hydrogen gas transfer system as claimed in claim 1, comprising a liquefied hydrogen storage tank configured to store liquefied hydrogen, wherein
- the gas supply passage includes a naturally vaporized gas supply passage configured to supply, to the gas compressor, the hydrogen gas which is naturally vaporized from the liquefied hydrogen, and
- the heater is disposed in the naturally vaporized gas supply passage.

3. The hydrogen gas transfer system as claimed in claim 2, wherein
- the gas supply passage includes a forcibly vaporized gas supply passage provided with a vaporizer configured to forcibly vaporize the liquefied hydrogen, the forcibly vaporized gas supply passage being configured to supply, to the gas compressor, hydrogen gas vaporized by the vaporizer.

4. The hydrogen gas transfer system as claimed in claim 3, wherein
- the gas supply passage includes a portion connected to the gas compressor, the portion being a common gas supply passage serving as both the naturally vaporized gas supply passage and the forcibly vaporized gas supply passage, and
- the heater is disposed in the common gas supply passage.

5. The hydrogen gas transfer system as claimed in claim 3, wherein
- the gas supply passage includes a portion connected to the gas compressor, the portion being a common gas supply passage serving as both the naturally vaporized gas supply passage and the forcibly vaporized gas supply passage, and
- the heater includes a first heater disposed in the naturally vaporized gas supply passage and upstream with respect to the common gas supply passage, and a second heater disposed in the forcibly vaporized gas supply passage and upstream with respect to the common gas supply passage, the second heater also serving as the vaporizer.

6. The hydrogen gas transfer system as claimed in claim 1, wherein the heater is configured to heat the hydrogen gas from a temperature lower than the boiling point of the seal gas to the predetermined temperature equal to or higher than the boiling point of the seal gas.

* * * * *